Feb. 16, 1965  J. F. EGAN ETAL  3,169,405
TIME DELAY DEVICE

Filed Jan. 13, 1961  2 Sheets-Sheet 1

JOHN F. EGAN
DONALD M. HARVEY
INVENTORS

BY R. Frank Smith

Paul R. Holmes

ATTORNEYS

Feb. 16, 1965   J. F. EGAN ETAL   3,169,405
TIME DELAY DEVICE
Filed Jan. 13, 1961                     2 Sheets-Sheet 2
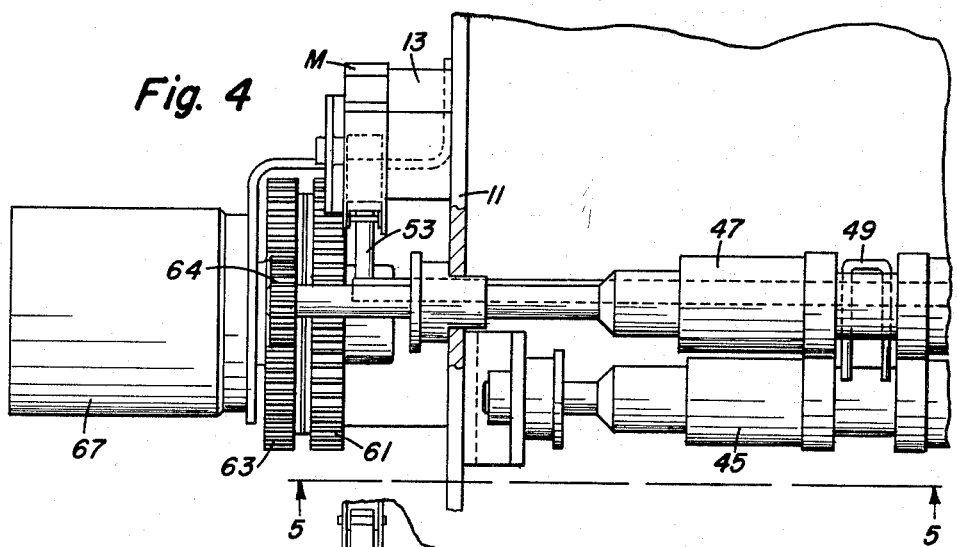
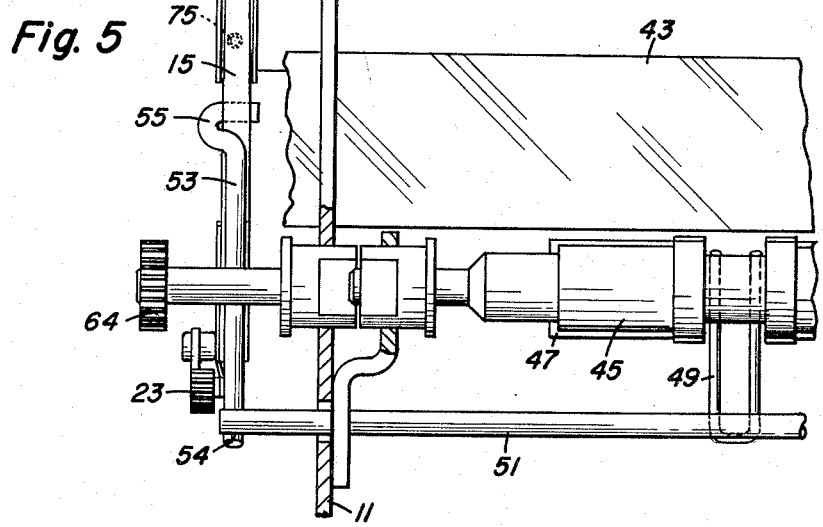
JOHN F. EGAN
DONALD M. HARVEY
INVENTORS
BY R. Frank Smith
Paul W. Holmes
ATTORNEYS

United States Patent Office 3,169,405
Patented Feb. 16, 1965

3,169,405
TIME DELAY DEVICE
John F. Egan and Donald M. Harvey, Rochester, N.Y.,
assignors to Eastman Kodak Company, Rochester, N.Y.,
a corporation of New Jersey
Filed Jan. 13, 1961, Ser. No. 82,436
3 Claims. (Cl. 74—3.5)

This application relates to a time delay device and more particularly to a mechanical device which may be used for delaying the switching in a microswitch for a short interval of time after an actuating movement has been applied to the switch arm thereof.

The time delay device of the present invention was designed for use in continuous flow-type document photographing machines hereinafter referred to as microfilmers and the following description will make reference to such apparatus although it is realized that many other applications of the time delay device are possible. In a flow-type microfilmer documents such as checks, letters, drawings, or other matter are fed through the microfilmer and are photographed as they move through the photographing station of the microfilmer. It is necessary to actuate the film advance and the shutter in the film unit of the microfilmer in timed sequence with the movement of each document through the photographing station. To do this trip fingers are placed in the path of the documents so that each document itself just before arriving in the photographing station actuates the shuter and film feed mechanism. In order that the shutter remain open and the film feed continue for a sufficient period of time after the trailing edge of the document has passed from under the trip fingers, so that the whole document is photographed, it is desirable to delay the switching of the microswitch which controls the shutter and film feed for a short interval after movement of the document from under the trip fingers. Many devices for accomplishing this end have been utilized such as, for example, relatively complicated mechanical and/or electronic means, or a second microswitch actuated by other trip fingers located on the other side of the photographing station. The simple time delay device of the present invention was designed to avoid the necessity of using such duplicate switches or other electronic or other mechanical devices and comprises broadly means carried on the end of the microswitch actuating arm for engaging a rotating member during movement of microswitch arm to the position at which switching of the microswitch occurs, whereby said means must be driven out of engagement with the rotating member by the rotation of that member before the microswitch arm can move to that position and the switching occurs.

The primary object of the present invention is, therefore, to provide a time delay device for delaying the movement after initiation of an actuating member to a predetermined position.

Another object of the present invention is to provide a time delay device for delaying the movement after initiation of the actuating arm of a microswitch to thereby delay the switching of the switch.

Still another object of the present invention is to provide a mechanical time delay device which is relatively simple and inexpensive to manufacture and which is of positive action relatively free of mechanical failures during use.

Still other objects and advantages of the present invention will become readily apparent to those skilled in the art from the following description with reference to the drawings in which like characters denote like parts and wherein:

FIG. 4 is a plan view partly in section of the apparatus taken along line 4—4 of FIG. 3;

FIG. 5 is a front elevation view taken along line 5—5 of FIG. 4; and

Figure 1:
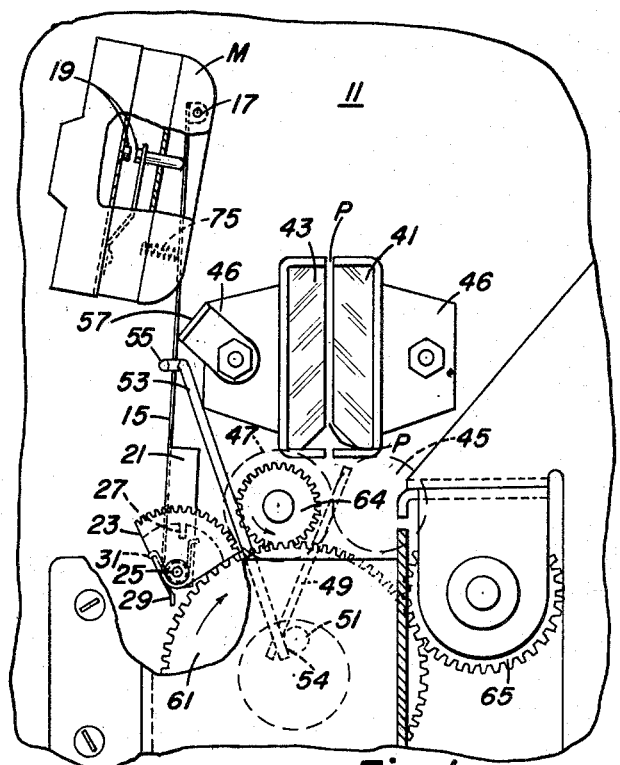
FIG. 1 is a side elevation view partly in section showing the time delay device of the present invention incorporated in a microfilmer.

In FIGS. 1 and 4, a microswitch M is shown mounted on and spaced from side frame 11 of a microfilmer by a spacer 13. The microswitch includes an actuating arm 15 which is pivotally mounted in the microswitch on a pin 17 and carries one of the two switch contacts 19 through which the electrical path controlled by the switch is opened or closed. A flange 21 is formed on the lower end of arm 15 to add rigidity to that portion of the arm. A sector 23 is pivotally mounted on a stud 25, which is carried by the flange 21. The sector 23 is formed with a stop 27 which cooperates with a tab 29 provided on the end of the arm 15 to limit the revolution of the sector. A torsion spring 31 is utilized to urge the sector 23 with its stop 27 into engagement with tab 29.

Figure 2:
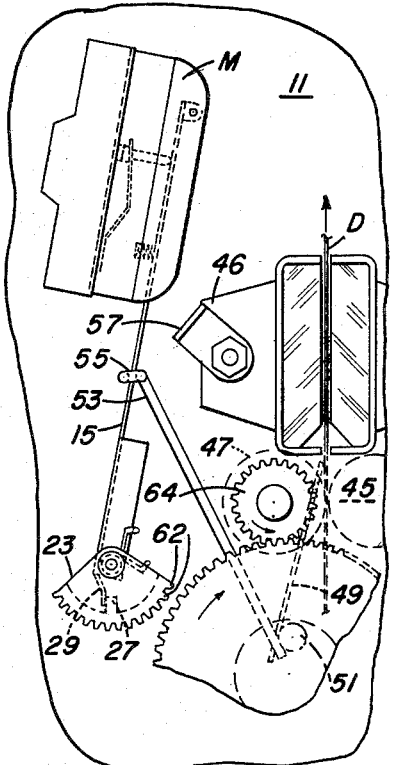
FIGS. 2 and 3 are views similar to FIG. 1 but show other positions taken by the time delay device in operation.
Figure 3:
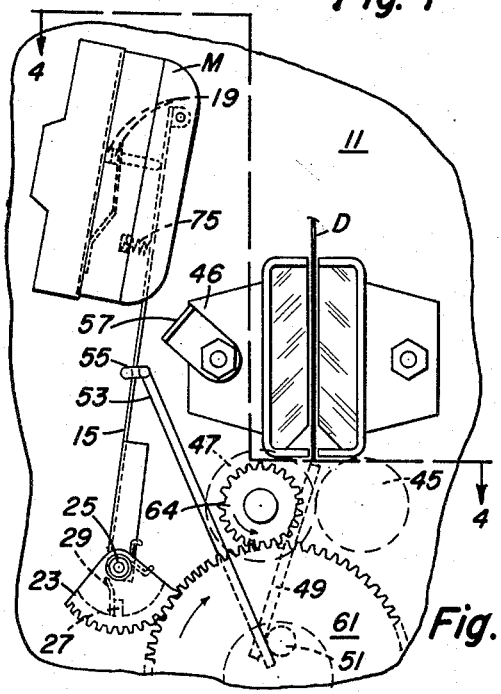

The photographing station P of the microfilmer, that is, the place at which the documents are illuminated so that the images thereof can be recorded on the film in the film unit of the microfilmer, is located between a pair of glass guides 41 and 43. Glass guides 41 and 43 are supported in spaced relation in the microfilmer by means of brackets 46 which are mounted to the side frames 11 (only one of which is shown) of the microfilmer. Each document, such as document D shown in FIGS. 2 and 3, is advanced in succession to the photographing station P by a document conveyor which comprises the guide rollers 45 and 47. Rollers 45 and 47 are carried on shafts which are mounted in suitable bearings carried in or supported from the side frames 11. Document trip fingers 49, of which there may be several acting together as a unit, are positioned in the document path so as to be engaged by each document as it is advanced by the guide rollers 45 and 47 to photographing station P. The trip fingers 49 are carried on a shaft 51 which extends through the side frames 11 of the microfilmer and carries the control arm 53 rigidly attached thereto as at 54. The other end of control arm 53 is formed with a loop 55 which is positioned around the microswitch arm 15 so that movement of the control arm is imparted to the microswitch arm and vice versa. A stop 57 for the microswitch arm 15 is mounted on the bracket 46 and prevents the arm 15 from overtraveling. As can best be seen in FIGS. 1 through 3, the angular relationship of control arm 53 to that of trip fingers 49 is such that when no document is passing between the guide rollers 45 and 47, the microswitch arm 15 takes the position indicated in FIG. 1 at which contacts 19 are spaced and the electrical path through the microswitch is open. However, after a document has engaged the trip fingers 49 or is supporting the fingers 49 on the surface thereof as shown in FIG. 2, the control arm 53 is pivoted by shaft 51 and moves switch arm 15 about pin 17, thereby closing the contacts 19 and the electrical path. The sector 23 is then free for rotation by the torsion spring 31 to the position where the stop 27 engages the tab 29 as shown in FIG. 2 thus orienting the sector with respect to gear 61 so that the teeth 62 adjacent to one end of the sector 23, first engage gear 61 upon initial contact therewith. When the document passes from under the trip fingers 49 the control arm 53 moves to the position shown in FIG. 3 permitting the sector 23 to engage the gear 61. Gear 61 is driven in the direction of the arrow through a clutch from gear 63 which, in turn, is rotated continuously by a motor, not shown, through suitable gearing, also not shown.

Guide rollers 47 and the shaft on which they are mounted are driven by a gear 64 which is carried on the shaft and meshes with the continuously rotating gear 63. The film advance in the film unit of the microfilmer is actuated and controlled through a gear 65 which is mounted in engagement with gear 61 and forms the first gear of the gear train for the film advance. The numeral 67 designates the housing for the clutch coil which actuates and de-energizes the clutch to thereby control the rotation of gear 61.

Figure 6:
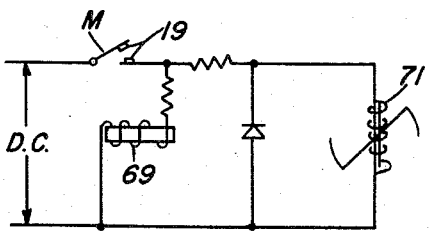
FIG. 6 is a schematic wiring view further illustrating the operation of the device.

In FIG. 6, the clutch coil and shutter solenoid coil are indicated by the numerals 69 and 71, respectively. When a document D is supporting trip finger 49 as in FIG. 2, contacts 19 are closed and both the clutch coil 69 and shutter solenoid coil 71 are energized so that gear 61 is rotating, the film is being advanced in the film unit and the shutter, not shown, for the film unit is open. When document D passes from under the trip fingers 49, as shown in FIG. 3, the movement of actuating arm 15 to the position at which sector 23 first engages gear 61, is not sufficient to open the contacts 19 with the result that as long as the teeth of sector 23 remain in mesh with those of gear 61, the clutch coil and shutter solenoid coil continue to be energized. However, when sector 23 is driven by gear 61 to the point where its teeth no longer are meshing with those of gear 61, as shown, for example, in FIG. 1, then the position of actuating arm 15 is such that contacts 19 are opened, the rotation of gear 61 stops and the shutter for the film unit closes. Microswitch M includes a spring 75 for urging the actuating arm 15 to the position where contacts 19 are open. For the specific use described, it was found that this spring is sufficient to return trip fingers 49 into the document path, that is, the position shown in FIG. 1, after passage of a document. In some installations, it was found that gravity alone was sufficient to accomplish this same result. However, in any specific situation, it would be possible, of course, to add additional springs if such were required.

From the foregoing description it will be appreciated by those skilled in the art that the time delay device of the present invention permits one to delay the actuation of a microswitch for a period of time after release of the actuating arm of the switch which period will depend in part upon the speed of rotation of the gear 61, the length of the sector 23 and the length and position of the actuating arm 15. It is obvious that the same arrangement could be used for controlling any lever operated apparatus and is not necessarily limited to a microswitch. Similarly when one is using the invention to control a microswitch, it is obvious that the microswitch may be used to control an electrical circuit in any type of an apparatus and is not limited to use in a microfilmer. So too, the actuating force applied to the actuating arm of the microswitch could be derived from any suitable mechanical movement and need not be a document actuated mechanism. In addition, friction gearing instead of toothed gears could be satisfactorily utilized.

Thus, while only one embodiment of the present invention has been specifically illustrated and described, it is realized that many modifications and variations are possible and will be readily apparent to those skilled in the art from the foregoing description which is intended, therefore, to be illustrative only and the scope of the invention is defined in the appended claims.

Having now particularly described our invention what we desire to secure by Letters Patent of the United States and what we claim is:

1. A time delay device for use in an apparatus having an element which is driven for rotation about a fixed axis, said device comprising:
   (a) a member having spaced ends;
   (b) means for pivotally mounting one of said ends so that the other is moveable between at least two spaced positions;
   (c) means for moving said other end from one to the other of said positions;
   (d) engaging means carried by and mounted for rotation about said other end of said member;
   (e) said engaging means having one peripheral surface for engaging the rotating periphery of said element after the initiation of movement of said other end toward said one of said positions and a second peripheral surface disposed in angularly spaced relation to said one surface for abutting the rotating periphery of said driven element when said other end is in said one position; and
   (f) means for aligning said one surface for engagement with said element prior to such engagement therewith;
   (g) whereby the movement of said other end to said one position is delayed during the time between first engagement of said one surface with said driven element and abutting of said second surface with said driven element.

2. A time delay device in accordance with claim 1 and wherein the distance between the second surface and the axis about which said engaging means is rotatably mounted is less than that between said one surface and such axis.

3. A time delay device for use in an apparatus which includes rotating gear means, said device comprising:
   (a) a member pivotally mounted for movement relative to said gear means between two spaced positions;
   (b) means for moving said member from one to the other of said positions;
   (c) a sector mounted for rotation on and with respect to said member at a location spaced from that about which the member is pivotally mounted;
   (d) stop means on said member for contacting the sector to operatively align the same for engagement with said gear means when said member is in said one position; and
   (e) biasing means for resiliently urging said sector into contact with said stop means to maintain the sector in alignment with said gear means prior to engagement with the gear means during movement of said member to said other position;
   (f) whereby the movement of the member from said one position to said other position is delayed from the time of first engagement of said sector and gear means until the sector is driven out of engagement with the rotating gear means.

References Cited in the file of this patent
UNITED STATES PATENTS

| | | |
|---|---|---|
| 2,359,580 | Poole | Oct. 3, 1944 |
| 2,436,448 | Padelferd | Feb. 24, 1948 |
| 2,439,165 | Graves | Apr. 6, 1948 |
| 2,693,231 | Morganson | Nov. 2, 1954 |
| 2,877,835 | Werr et al. | Mar. 17, 1959 |